No. 772,759. PATENTED OCT. 18, 1904.
G. S. TIFFANY.
HANDLE BAR SUPPORT FOR BICYCLES.
APPLICATION FILED NOV. 19, 1903.
NO MODEL.
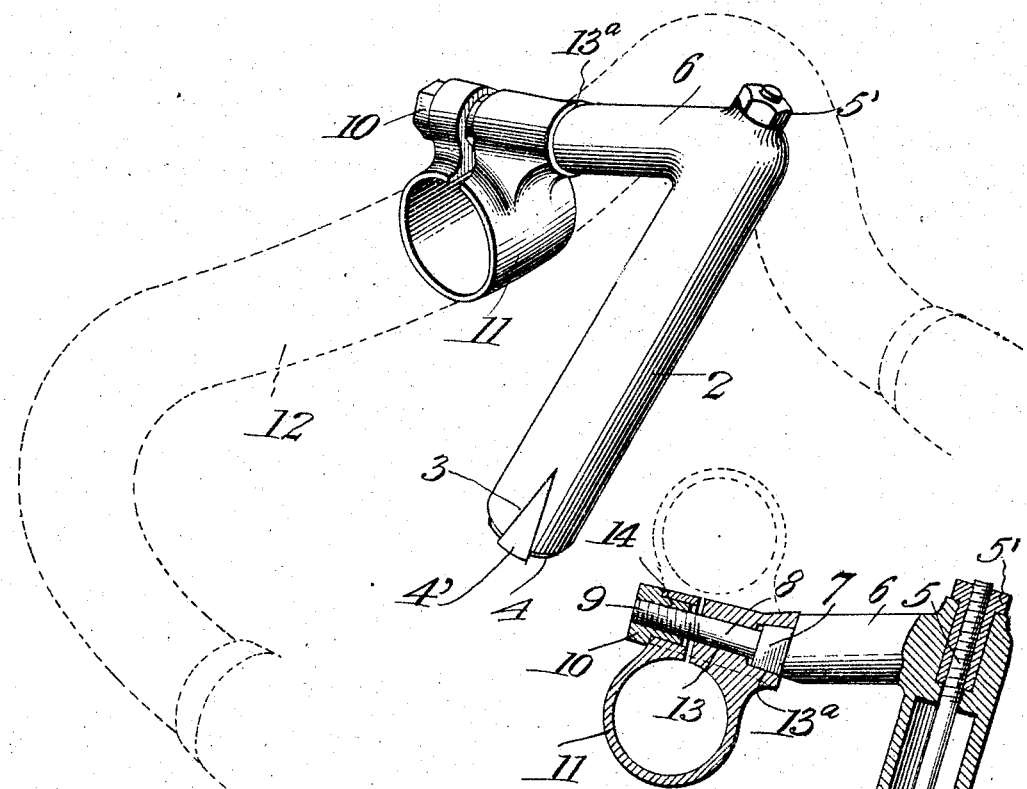
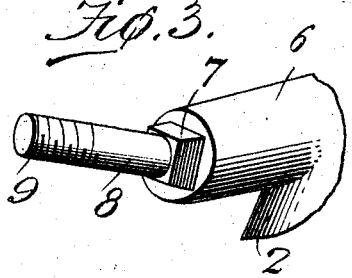
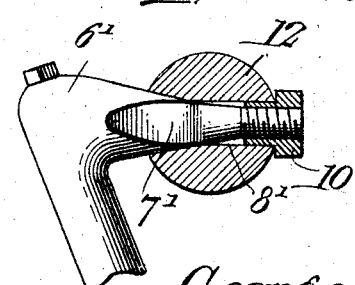
Witnesses
George S. Tiffany, Inventor
by C A Snow & Co
Attorneys No. 772,759.

Patented October 18, 1904.

UNITED STATES PATENT OFFICE.

GEORGE S. TIFFANY, OF HUTCHINSON, KANSAS.

HANDLE-BAR SUPPORT FOR BICYCLES.

SPECIFICATION forming part of Letters Patent No. 772,759, dated October 18, 1904.

Application filed November 19, 1903. Serial No. 181,860. (No model.)

*To all whom it may concern:*

Be it known that I, GEORGE S. TIFFANY, a citizen of the United States, residing at Hutchinson, in the county of Reno and State of Kansas, have invented a new and useful Handle-Bar Support for Bicycles, of which the following is a specification.

This invention relates to an improved handle-bar support for bicycles, and has for its object to provide a simple, inexpensive, and efficient device of this character by means of which the handle-bar may be readily raised or lowered and securely clamped in adjusted position.

A further object of the invention is to provide means whereby the handle-bar may be quickly reversed without the necessity of detaching the same from the post or stem and means for simultaneously adjusting and securely clamping the handle-bar within the socket on said stem or post.

The invention consists in the construction and novel combination and arrangement of parts hereinafter fully described, illustrated in the accompanying drawings, and pointed out in the claims hereto appended, it being understood that various changes in form, proportion, and minor details of construction may be resorted to without departing from the principle or sacrificing any of the advantages of this invention.

In the accompanying drawings, Figure 1 is a perspective view of a handle-bar support constructed in accordance with my invention. Fig. 2 is a longitudinal sectional view of the same. Fig. 3 is a detail perspective view of the stem or post with the handle-bar detached, and Fig. 4 is a longitudinal sectional view of a modified form of the invention.

Similar numerals of reference indicate corresponding parts in all the figures of the drawings.

2 designates a tubular handle-bar post or stem having tapering or wedge-shaped side slots 3 at its lower end, the bore of the post or stem being fitted with a cylindrical plug 4, provided with corresponding wedge-shaped ribs 4', adapted to engage the slots 3, as shown. The plug 4 is operated by a rod 5, the threaded end of which engages a flanged nut 5' and by means of which the rod is adjusted to expand the slotted end of the stem and clamp the same in the hollow head on the front-wheel fork of a bicycle.

The upper end of the stem or post 2 is bent to form a supporting-arm 6, provided with a squared shoulder 7, defining a reduced extension 8, the end of which is threaded, as shown at 9, for the reception of a clamping-nut 10. Mounted on the extension 8 is a clamp or socket member 11, adapted to receive the handle-bar 12, said socket being provided with a transversely-disposed opening or bore 13, one end of which is squared, as shown at 13ª, and adapted to engage the shoulder 7 on the arm 6 and prevent rotary movement of said socket member. The diameter of the bore 13 is somewhat greater than that of the extension 8, so as to permit the circular sleeve or collar 14 of the clamping-nut 10 to slide within the bore when said nut is tightened and clamp the socket member in engagement with the handle-bar and also to protect the threads on the extension 8 and form a bearing for the socket member when the same is reversed, as will be more fully explained hereinafter.

When it is desired to reverse the handle-bar, the nut 10 is loosened and the socket member 11 moved longitudinally on the extension 8 until the squared portion thereof is disengaged from the shoulder 7, when said socket member and handle-bar may be swung upwardly on the sleeve 14 of the nut 10 to a position above the supporting-arm, as indicated in dotted lines in Fig. 2 of the drawings. After the handle-bar has been raised in the manner above described said bar may be adjusted to any desired angular position with respect to the clamp or socket 11 by rotating the handle-bar within the same and tightening the nut, the nut clamping the socket member in engagement with the shoulder and at the same time the handle-bar within the socket member, thereby securely holding the several parts in the adjusted position. It is obvious that to reverse the handle-bar it is only necessary to reverse the operation above described and that by turning the nut slightly the handle-bar may be adjusted within the socket without the necessity of reversing the same. By releasing the nut 10 the handle-bar may also be swung upwardly in substantially the same plane with the stem or post to permit the handle-bar to clear any obstructions, while by adjusting the expander the stem, together with the supporting-arm and handle-bar, may be, turned rearwardly, causing the handle-bar to assume a position slightly in advance of the rider.

In Fig. 4 I have shown a modified form of the invention in which the supporting-arm 6' is formed tapering or conical with a plurality of flat or squared faces 7' near the juncture of the arm with the stem or post, the handle-bar being provided with a correspondingly-shaped central opening 8', adapted to receive the arm, being adjusted thereon and held in the adjusted position by the nut 10' in the manner before described.

If desired, the same style of handle-bar illustrated in Fig. 4 may be used in connection with the supporting-arm shown in Fig. 3, in which event the socket member will of course be dispensed with.

From the foregoing description it will be seen that I have provided an exceedingly simple and efficient means for reversing the handle-bar and adjusting the same at an angle with relation to the socket, the relative disposition of the several parts permitting both adjustments to be accomplished simultaneously and by means of a single clamping-screw.

Having thus described the invention, what is claimed is—

1. A device of the class described comprising a supporting-arm provided with a squared shoulder defining a reduced threaded extension, an adjustable handle-bar clamp revolubly mounted on the extension and provided with a correspondingly-squared socket adapted to receive said shoulder, and a nut engaging the threaded extension for contracting the clamp and locking the same in engagement with the shoulder.

2. A device of the class described comprising a supporting-arm provided with a threaded extension, an adjustable handle-bar clamp revolubly mounted on said arm, and a nut provided with a sleeve or collar fitting within the clamp and engaging the threaded extension for contracting the clamp and locking the same in adjusted position.

3. A device of the class described comprising a post or stem, a supporting-arm carried by the stem and provided with a squared shoulder defining a threaded extension, an adjustable handle-bar clamp revolubly mounted on said extension, and a nut provided with a sleeve or collar fitting within the clamp and engaging the threaded extension for contracting the clamp and locking the same in engagement with the shoulder.

4. A device of the class described comprising a supporting-arm having a reduced extension provided with terminal threads, an adjustable handle-bar clamp revolubly mounted on said extension, said clamp and extension being provided with interlocking parts, and a nut provided with a sleeve or collar fitting within the clamp and engaging the terminal threads of the extension for contracting the clamp and locking the same in adjusted position.

In testimony that I claim the foregoing as my own I have hereto affixed my signature in the presence of two witnesses.

GEORGE S. TIFFANY.

Witnesses:
FRED S. SCORESBY,
W. W. LEWIS.